United States Patent
Satani (10) Patent No.: US 7,660,928 B2
(45) Date of Patent: Feb. 9, 2010

(54) ABITRATION CIRCUIT PROVIDING STABLE OPERATION REGARDLESS OF TIMING FOR READ AND WRITE REQUESTS

(75) Inventor: Norihiko Satani, Miyazuki (JP)

(73) Assignee: Oki Semiconductor Co., Ltd. (JP)

( * ) Notice: Subject to any disclaimer, the term of this patent is extended or adjusted under 35 U.S.C. 154(b) by 84 days.

(21) Appl. No.: 11/957,726

(22) Filed: Dec. 17, 2007

(65) Prior Publication Data

US 2008/0215785 A1 Sep. 4, 2008

(30) Foreign Application Priority Data

Mar. 2, 2007 (JP) .............................. 2007-052369

(51) Int. Cl.
  *G06F 13/38* (2006.01)
  *G06F 13/14* (2006.01)
  *G06F 13/36* (2006.01)
  *G06F 12/00* (2006.01)
(52) U.S. Cl. ..................... 710/244; 710/114; 710/241
(58) Field of Classification Search ................. 710/241, 710/244
See application file for complete search history.

(56) References Cited

U.S. PATENT DOCUMENTS 3,617,776 A * 11/1971 Priel ........................... 327/204
4,752,872 A * 6/1988 Ballatore et al. ............. 710/118
6,188,260 B1 * 2/2001 Stotz et al. ................... 327/202
6,269,418 B1 * 7/2001 Nakamura ................... 710/113
6,703,881 B2 * 3/2004 Lu .............................. 327/203
7,000,131 B2 * 2/2006 Miller et al. ................. 713/322
2005/0108455 A1 * 5/2005 Miller et al. ................. 710/113

FOREIGN PATENT DOCUMENTS

JP 2004-348463 12/2004

\* cited by examiner

*Primary Examiner*—Ryan M Stiglic
(74) *Attorney, Agent, or Firm*—Studebaker & Brackett PC; Donald R. Studebaker (57) ABSTRACT

The present invention provides an arbitration circuit capable of stable operation regardless of timings for read and write requests. A latch signal of a predetermined pulse width is generated in accordance with a read request signal or a write request signal and supplied to latches. Flip-flops or FFs respectively fetch therein write and read requests produced within the time of the latch signal. The latches respectively output the fetched requests as signals at the same timing. Thus, since the timings for the signals coincide with each other even when the write request and the read request are made at close intervals while the latch signal is being outputted from a latch controller, a write control signal or a read control signal can be stably outputted in accordance with the order of priority defined in advance by a delay unit.

2 Claims, 9 Drawing Sheets

Prior Art

FIG. 3

Prior Art

FIG. 4

Prior Art

ABITRATION CIRCUIT PROVIDING STABLE OPERATION REGARDLESS OF TIMING FOR READ AND WRITE REQUESTS

BACKGROUND OF THE INVENTION

The present invention relates to an arbitration circuit which adjusts operating timings for reading, writing and the like carried out on an asynchronous basis in a first-in first-out memory (hereinafter called "FIFO memory") or the like.

Since a read operation and a write operation are performed asynchronously in a FIFO memory, an internal read transfer operation (operation of transferring data read from each memory cell to its corresponding register) and a write transfer operation (operation of transferring data written into a register to its corresponding memory cell) are also fully performed asynchronously. Since, however, the operations of effecting reading and writing on each memory cell cannot be carried out simultaneously, access to the memory cell is done with the timings for the read and write operations being shifted. A circuit for controlling the timing provided to access each memory cell, based on the order of priority is of an arbitration circuit.

Figure 2:
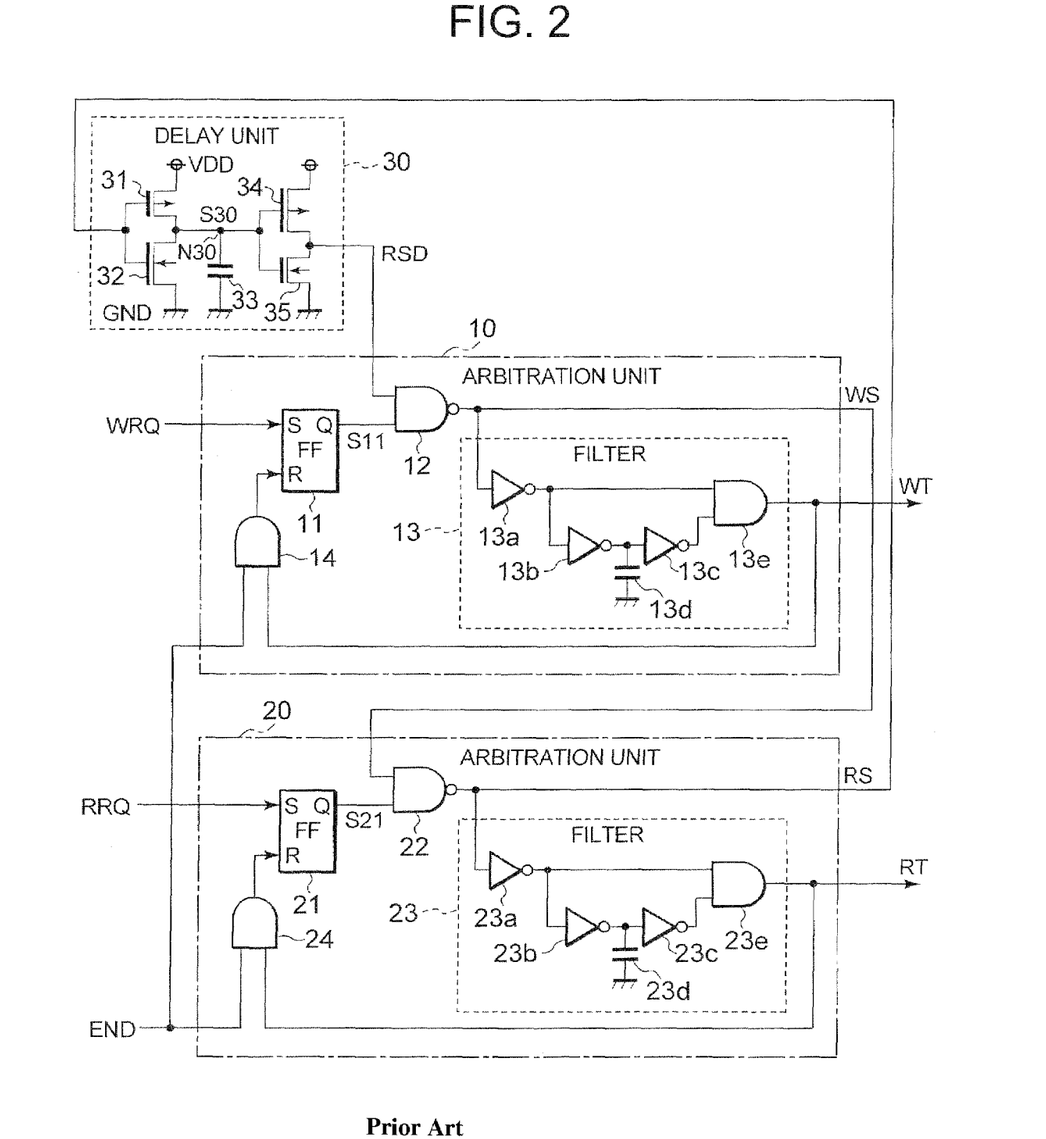
FIG. 2 is a configuration diagram illustrating one example of a conventional arbitration circuit.

FIG. 2 is a configuration diagram showing one example of a conventional arbitration circuit.

The arbitration circuit comprises an arbitration unit 10 for write transfer control, an arbitration unit 20 for read transfer control, and a delay unit 30 for giving a priority to a write transfer. Since the arbitration units 10 and 20 are similar in configuration, the arbitration unit 10 will now be explained specifically.

The arbitration unit 10 has an SR type flip-flop (hereinafter called "FF") 11. A set terminal S of the FF 11 is supplied with a write request signal WRQ. An output terminal Q of the FF 11 is connected to one input side of a two-input negative AND gate (hereinafter called "NAND") 12. A read set signal RS of the arbitration unit 20 is supplied to the other input side of the NAND 12 as a delay read set signal RSD with being delayed by the delay unit 30. The output of the NAND 12 is supplied to a filter 13 and supplied to the arbitration unit 20 as a write set signal WS.

When the output of the NAND 12 changes from a level "L" to a level "H", the filter 13 outputs a signal of "L" immediately. When the output of the NAND 12 changes from "H" to "L", the filter 13 delays it and outputs a signal of "H". The filter 13 has inverters 13a, 13b and 13c of three stages connected in tandem. The output of the NAND 12 is supplied to the first-stage inverter 13a. The output side of the inverter 13b is connected to a ground potential GND via a capacitor 13d. An AND gate (hereinafter called "AND") 13e ANDs the outputs of the inverters 13a and 13c and outputs the result of ANDing as a write control signal WT. Further, the write control signal WT is ANDed with a transfer end signal END by an AND 14 and the result of ANDing is supplied to a reset terminal R of the FF 11.

The arbitration unit 20 is similar in configuration to the arbitration unit 10 because the write request signal WRQ, the write set signal WS and the write control signal WT employed in the arbitration unit 10 are simply read as a read request signal RRQ, a read set signal RS and a read control signal RT respectively.

On the other hand, the delay unit 30 delays an inputted read set signal RS only for a predetermined time and outputs a delay read set signal RSD in which a pulse width of "L" is made short. The delay unit 30 has an inverter which is constituted of a P channel MOS transistor (hereinafter called "PMOS") 31 and an N channel MOS transistor (hereinafter called "NMOS") 32 and which inverts the read set signal RS and outputs it. A capacitor 33 used as a delay element is connected between a node N 30 corresponding to the output side of the inverter and the ground potential GND.

Further, an inverter constituted of a PMOS 34 and an NMOS 35 is connected to the node N 30, and a delay read set signal RSD is outputted from the inverter. Incidentally, the gate widths of the NMOS 32 and the PMOS 34 are set larger than those of the PMOS 31 and the NMOS 35 respectively, whereby a pulse width of "L" to be outputted is set short.

Figure 3:
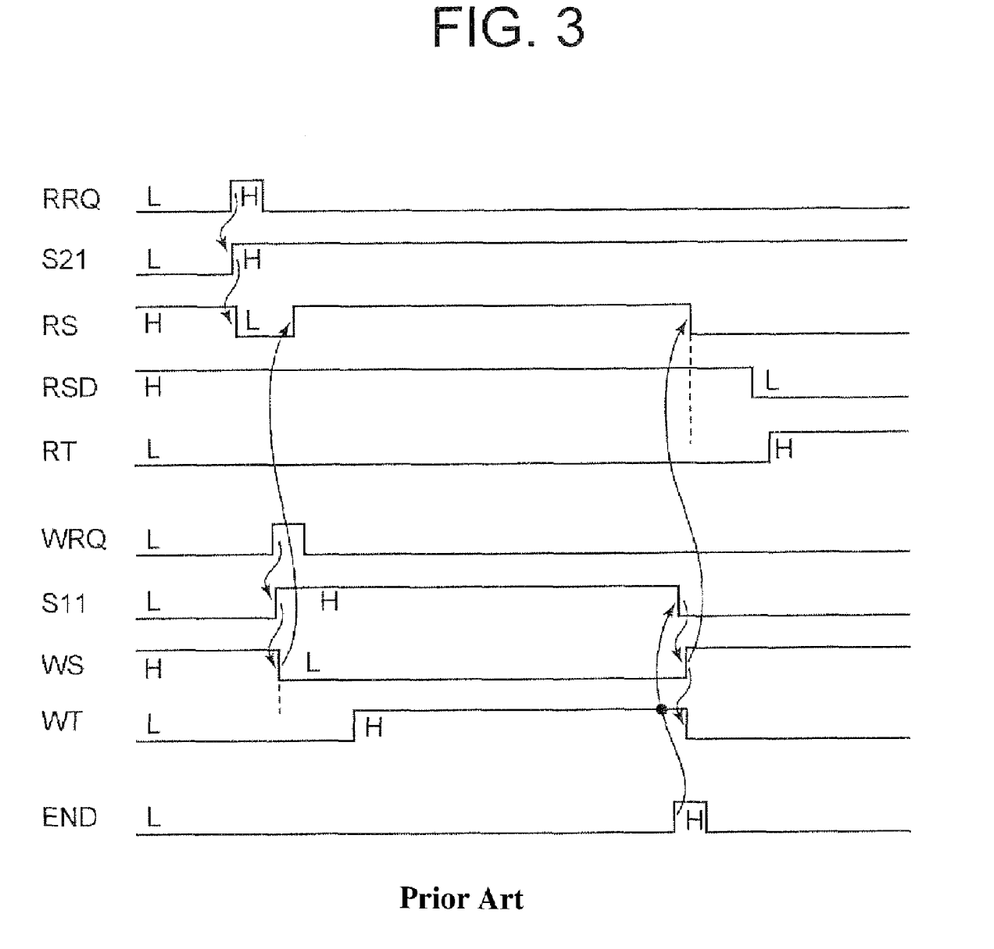
FIG. 3 is a signal waveform diagram showing operations of FIG. 2.

FIG. 3 is a signal waveform diagram showing operations of FIG. 2.

When write and read requests are not made, the FFs 11 and 12 are reset by a transfer end signal END given prior to the write and read requests. Signals S11 and S21 outputted from the FFs 11 and 12 are of "L". Thus, a write set signal WS and a read set signal RS are both brought to "H", and a write control signal WT and a read control signal RT are both brought to "L".

Now, when a read request signal RRQ is brought to "H" by the occurrence of the read request, the FF 21 is set so that its signal S21 changes to "H". Thus, the read set signal RS changes to "L" immediately. However, the read control signal RT is not brought to "H" immediately because of a delay made by a filter 23 but kept in a state of "L" for a while. If the write request is not produced during this period, then the read control signal RT is delayed by the filter 23 and thereafter changes to "H".

On the other hand, the read set signal RS is supplied to the delay unit 30 where it is delayed by a predetermined time. Therefore, a delay read set signal RSD is held "H" during the delay time of the delay unit 30.

Assume now that the write request is produced and a write request signal WRQ is brought to "H" during the period in which the delay read set signal RSD is "H", immediately after the occurrence of the read request. With the "H" of the write request signal WRQ, the FF 11 is set and its signal S11 changes to "H". Since the delay read set signal RSD is of "H" at this point of time, the write set signal WS outputted from the NAND 12 changes to "L" immediately.

Since the write set signal WS is supplied to the NAND 22, the read set signal RS outputted from the NAND 22 is returned to "H". The read control signal RT outputted from the filter 23 remains at "L" and its change is stopped.

The filter 13 of the arbitration unit 10 outputs a write control signal WT of "H" after the elapse of a predetermined delay time in response to the write set signal WS of "L". Consequentially, a write transfer is started.

When the write transfer is completed, a transfer end signal END is given. Thus, the FF1 is reset so that its signal S11 is brought to "L" and the write set signal WS and the write control signal WT are respectively returned to "H" and "L". Since the read control signal RT is of "L" at this time, the FF 21 remains set and its signal S21 is "H".

With the returning of the write set signal WS to "H", a read set signal RS outputted from the NAND 22 is brought to "L" again and supplied to the filter 23 and the delay unit 30. If no write request signal WRQ is supplied within a predetermined delay time of the delay unit 30, then a delay read set signal RSD is brought to "L" after the delay time. With the setting of the delay read set signal RSD to "L", priority processing of a subsequent write request signal WRQ is stopped.

After the delay time of the filter 23, the read control signal RT is brought to "H", so that a read transfer is started. Incidentally, when the read transfer is completed, a transfer end signal END is given, whereby the FF 21 is reset, thus returning to a first or initial state.

In the arbitration circuit, the set signal of other arbitration unit is stopped base on the set signals WS and RS of the arbitration units 10 and 20 thereby to control the timings for the two transfer requests. In the arbitration circuit of such a system, there is a fear that such an oscillation state that the set signals WS and RS take "L" and "H" repeatedly alternately according to the timings for the two request signals WRQ and RRQ, is reached. In the arbitration circuit, the filters 13 and 23 provided within the arbitration units 10 and 20, and the delay unit 30 provided between the arbitration units 10 and 20 suppress the oscillations of the set signals WS and RS. That is, the outputs (changes from "H" to "L") of the set signals WS and RS are delayed by the filters 13 and 23 respectively, and the period during which the set signal RS is "L" is shortened by the delay unit 30, thereby attenuating such a pulse width that each of the set signals WS and RS becomes "L" to suppress the oscillations.

The above-related art refers to a patent document 1 (Japanese Unexamined Patent Publication No. 2004-348463).

In the arbitration circuit, however, there has arisen a feat that the pulse widths of the set signals WS and RS would become short extremely depending upon the timings for the read and write requests, thus resulting in a malfunction.

Figure 4:
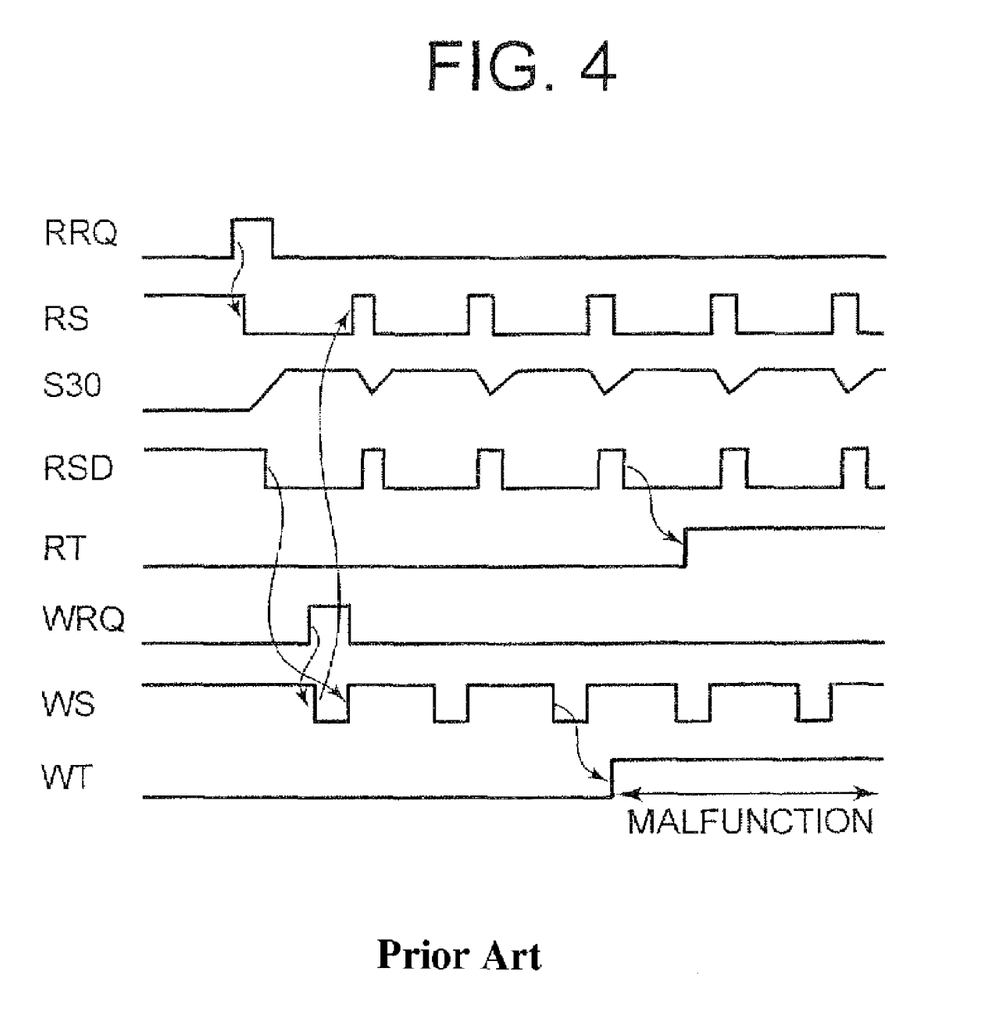
FIG. 4 is a signal waveform diagram for describing problems of the arbitration circuit shown in FIG. 2.

FIG. 4 is a signal waveform diagram for describing the problems of the arbitration circuit shown in FIG. 2.

When, as shown in FIG. 4, the timings provided to input the write request signal WRQ and the read request signal RRQ are away a little from each other and the set of the write set signal WS by the write request signal WRQ and the reset of the read set signal RS by the read request signal RRQ are close to each other, the time during which the write set signal WS is brought to "L", becomes short. At this time, the time during which the read set signal RS is brought to "H" becomes short.

When the time during which the read set signal RS goes "H" becomes short, a change in the amplitude of a signal S30 of the node N30 in the delay unit 30 becomes small. When the change in the amplitude of the signal S30 becomes smaller, the pulse width of the read set signal RS corresponding to the input signal of the delay unit 30 and the pulse width of the delay read set signal RSD corresponding to its output signal remain almost unchanged.

Therefore, such a state that the output signal of the delay unit 30 is outputted from the delay unit 30 as the read set signal RSD and the input signal of the delay unit 30 is inputted to the delay circuit 30 as the read set signal RS again, is repeated almost without attenuation of the pulse width of the read set signal RS. Thus, a problem arose in that the set signals WS and RS would be in an oscillation state, thereby causing a malfunction.

SUMMARY OF THE INVENTION

With the foregoing in view, an object of the present invention is therefore to provide an arbitration circuit capable of stable operation regardless timings for read and write requests.

According to one aspect of the present invention, for attaining the above object, there is provided an arbitration circuit comprising latch control means which outputs a latch signal of a predetermined pulse width when the occurrence of a first or second request signal is detected, first holding means which is set by the input of the first request signal and reset when an operation required by the first request signal is completed, first latch means which fetches therein a state of the first holding means while the latch signal is being outputted and outputs the fetched state when the latch signal is stopped, first gate means which outputs a first enable signal in a set state of an output signal of the first latch means and when a delay enable signal is not supplied, second holding means which is set by the input of the second request signal and reset when an operation required by the second request signal is completed, second latch means which fetches therein a state of the second holding means while the latch signal is being outputted and outputs the fetched state when the latch signal is stopped, second gate means which outputs a second enable signal in a set state of an output signal of the second latch means and when the first enable signal is not outputted, and delay means which delays the second enable signal and supplies the same to the first gate means as the delay enable signal.

The present invention includes first and second holding means set by first and second request signals, latch control means which outputs a latch signal of a predetermined pulse width when the occurrence of the first or second request signal is detected, and first and second latch means which respectively fetch therein a write request and a read request produced within the time of the latch signal and outputs the fetched requests at the same timing. Thus, since the timings for the signals outputted from the first and second latch means coincide with each other even when the first and second request signals are given at close intervals while the latch signal is being outputted, a stable arbitration operation can be carried out in accordance with the order of priority defined in advance.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

The above and other objects and novel features of the present invention will become more completely apparent from the following descriptions of preferred embodiments when the same is read with reference to the accompanying drawings. The drawings, however, are for the purpose of illustration only and by no means limitative of the scope of the invention.

First Preferred Embodiment

Figure 1:
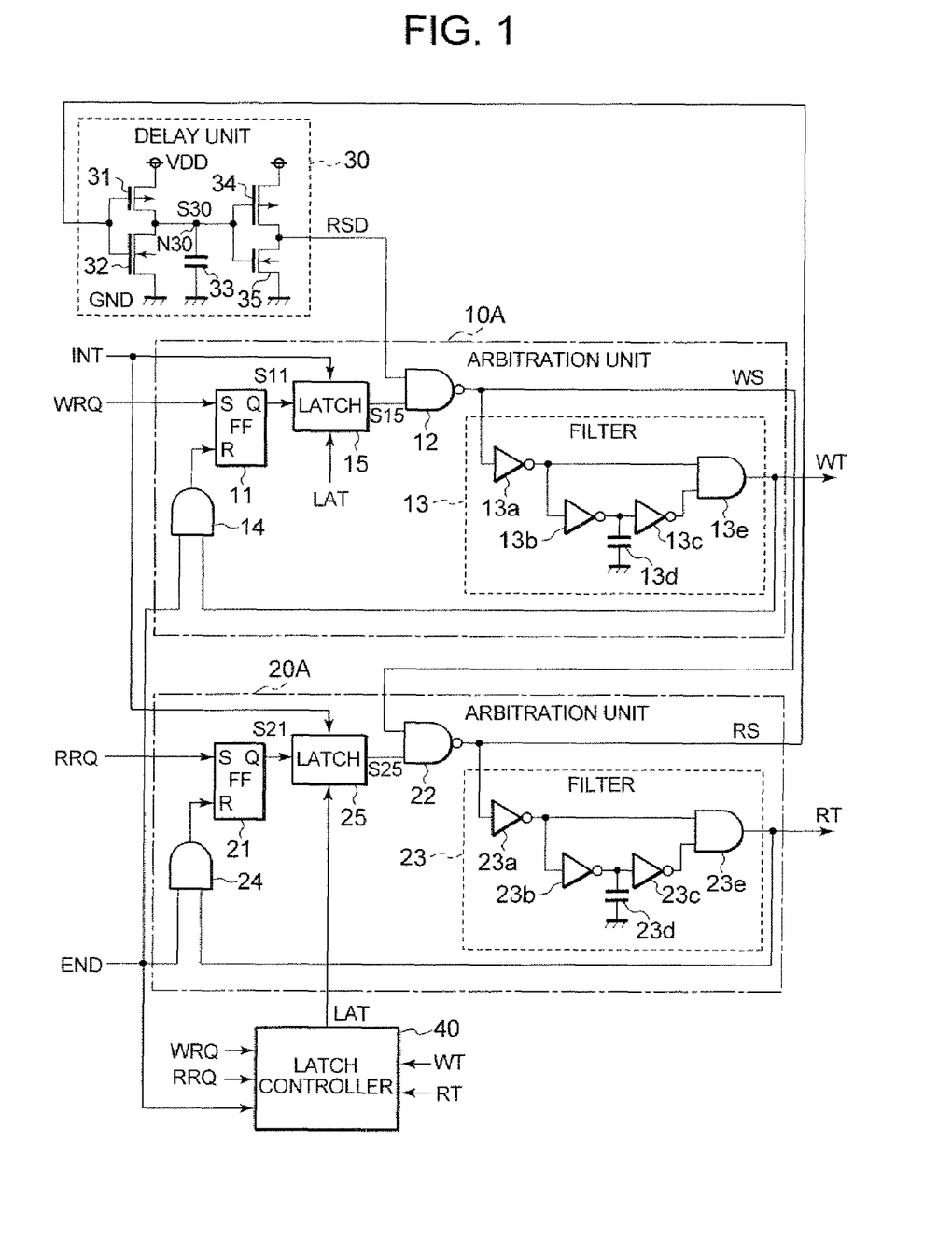
FIG. 1 is a configuration diagram of an arbitration circuit showing a first embodiment of the present invention.

FIG. 1 is a configuration diagram of an arbitration circuit showing a first embodiment of the present invention. Common reference numerals are respectively attached to elements common to the elements in FIG. 2.

The arbitration circuit is provided with arbitration units 10A and 20A respectively added with latches 15 and 25 in place of the arbitration units 10 and 20 shown in FIG. 2 and provided with a latch controller 40 for supplying a latch signal LAT to these added latches 15 and 25.

Since the arbitration units 10A and 20A are identical in configuration to the arbitration units 10 and 20 except that they are different from them in that the arbitration units 10A and 20A are respectively used for write transfer control and read transfer control, the arbitration unit 10A for the write transfer control will now be explained specifically.

The arbitration unit 10A has an SR type FF 11. A write request signal WRQ is supplied to a set terminal S of the FF 11. An output terminal Q of the FF 11 is connected to the input side of the latch 15. The latch 15 holds and outputs a signal S11 outputted from the FF 11, in accordance with a latch signal LAT supplied from the latch controller 40. Incidentally, the latch 15 is reset to its initial state in response to an initial reset signal INT.

The output side of the latch 15 is connected to one input side of a two-input NAND 12. A read set signal RS of the arbitration unit 20A is supplied to the other input side of the NAND 12 as a delay read set signal PSD with being delayed by a delay unit 30. The output of the NAND 12 is supplied to a filter 13 and supplied to the arbitration unit 20A as a write set signal WS.

When the output of the NAND 12 changes from "L" to "H", the filter 13 outputs a signal "L" immediately. When the output of the NAND 12 changes from "H" to "L", the filter 13 delays it and outputs a signal of "H". The filter 13 has inverters 13a, 13b and 13c of three stages connected in tandem. The output of the NAND 12 is supplied to the first-stage inverter 13a. The output side of the inverter 13b is connected to a ground potential GND via a capacitor lid. An AND 13e ANDs the outputs of the inverters 13a and 13c and outputs the result of ANDing as a write control signal WT corresponding to an enable signal for a write request signal WRQ. Further, the write control signal WT is ANDed with a transfer end signal END by an AND 14 and the result of ANDing is supplied to a reset terminal R of the FF 11.

The arbitration unit 20A is similar in configuration to the arbitration unit 10A because the write request signal WRQ, the write set signal WS and the write control signal WT employed in the arbitration unit 10A are simply read as a read request signal RRQ, a read set signal RS and a read control signal RT respectively.

On the other hand, the delay unit 30 delays an inputted read set signal RS only for a predetermined time and outputs a delay read set signal RSD in which a pulse width of "L" is made short. The delay unit 30 has an inverter which is constituted of a PMOS 31 and an NMOS 32 and which inverts the read set signal RS and outputs it. A capacitor 33 used as a delay element is connected between a node N 30 corresponding to the output side of the inverter and the ground potential GND.

Further, an inverter constituted of a PMOS 34 and an NMOS 35 is connected to the node N 30, and a delay read set signal RSD is outputted from the inverter. Incidentally, the gate widths of the NMOS 32 and the PMOS 34 are set larger than those of the PMOS 31 and the NMOS 35 respectively, whereby a pulse width of "L" to be outputted is set short.

Figure 5:
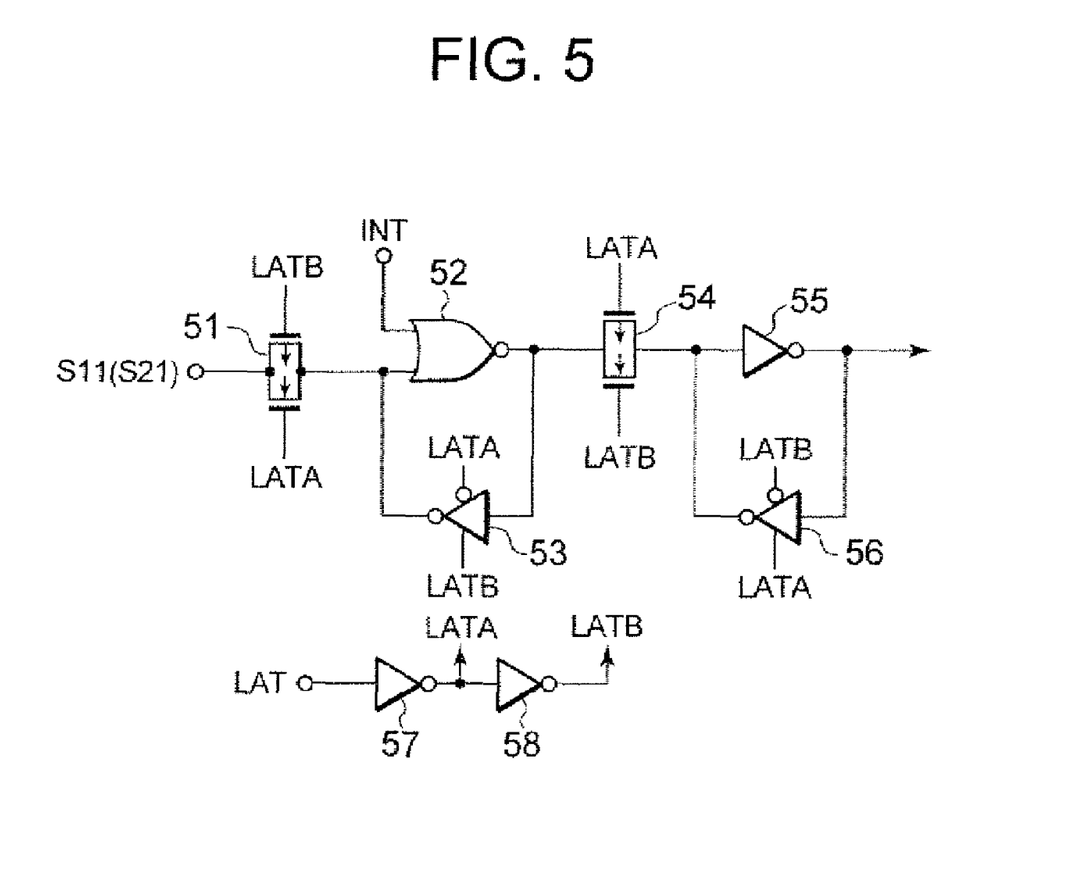
FIG. 5 is a configuration diagram illustrative of latches 15 and 25 shown in FIG. 1.

FIG. 5 is a configuration diagram illustrative of the latches 15 and 25 shown in FIG. 1.

The latch fetches the inputted signal therein when the latch signal LAT supplied from the latch controller 40 is of "L", and holds and outputs the fetched input signal when the latch signal LAT is of "H". The latch prevents an internal node from a floating state by the initial reset signal INT changed from "H" to "L" on power-up.

The latch has an analog switch 51 which on/off-controls a signal S11 (or S21) given as an input signal, based on latch signals LATA and LATB. The output side of the analog switch 51 is connected to one input side of a negative OR gate (hereinafter called "NOR") 52. The initial reset signal TNT is supplied to the other input side of the NOR 52.

The output side of the NOR 52 is connected to one input side via a gated inverter 53 controlled by the latch signals LATA and LATB and connected to the input side of an analog switch 54 controlled by the latch signals LATA and LATB. The output side of the analog switch 54 is connected to the input side of an inverter 55. The output side of the inverter 55 is connected to the input side thereof via a gated inverter 56 controlled by the latch signals LATA and LATB. The held signal is outputted from the output side of the inverter 55.

Incidentally, the latch signal LATA is produced by inverting the latch signal LAT supplied from the latch controller 40 by means of an inverter 57, whereas the latch signal LATB is generated by further inverting the latch signal LATB by means of an inverter 58.

Figure 6:
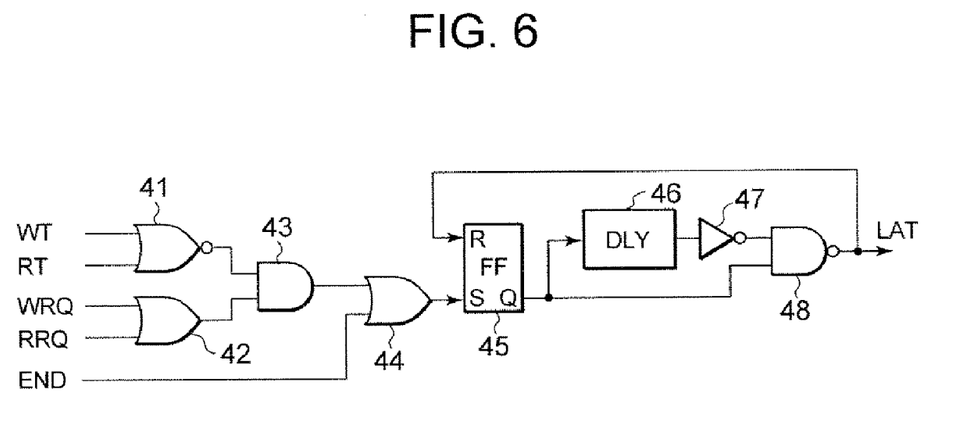
FIG. 6 is a configuration diagram of a latch controller 40 shown in FIG. 1.

FIG. 6 is a configuration diagram of the latch controller 40 shown in FIG. 1.

The latch controller 40 is a circuit which generates a one-shot pulse, based on a write request signal WRQ and a read request signal RRQ each corresponding to a transfer request signal, and a write control signal WT and a read control signal RT each corresponding to an enable signal indicative of an internal transfer operating state and supplies the same to the latches 15 and 25 lying in the arbitration units 10A and 20A as a common latch signal LAT.

The latch controller 40 has a NOR 41 which NORs the write control signal WT and the read control signal RT, and an OR gate (hereinafter called "OR") 42 which ORs the write request signal WRQ and the read request signal RRQ. The output sides of the NOR 41 and the OR 42 are connected to their corresponding input sides of an AND 43. The output side of the AND 43 is connected to one input side of an OR 44. A transfer end signal END is supplied to the other input side of the OR 44.

The output side of the OR 44 is connected to a set terminal S of an SR type FF 45. An output terminal Q of the FF 45 is connected to one input side of a NAND 48 and a delay element (DLY) 46. The output side of the DLY 46 is connected to the other input side of the NAND 48 via an inverter 47. The output side of the NAND 48 is connected to a reset terminal R of the FF 45. A latch signal LAT is outputted from the output side of the NAND 48.

Figure 7:
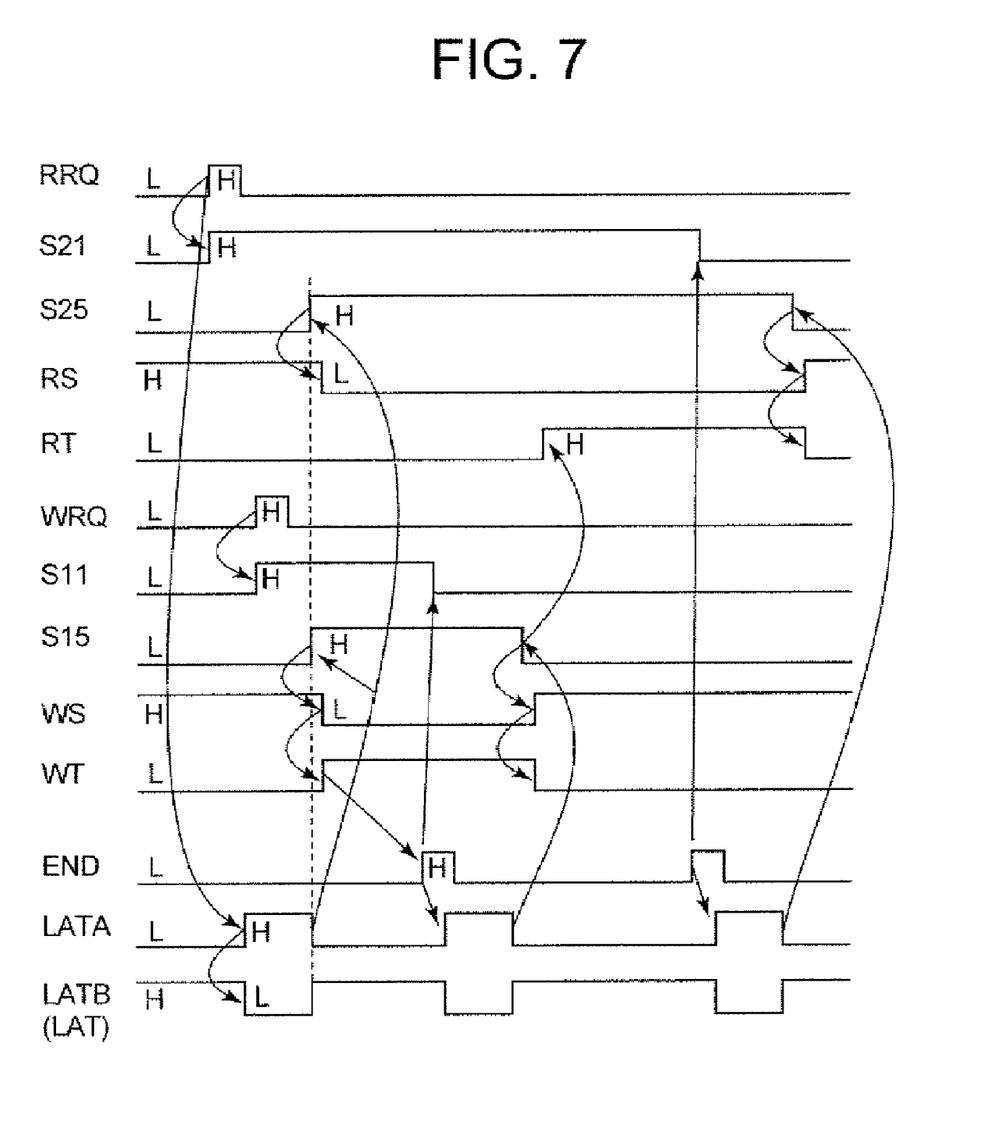
FIG. 7 is a signal waveform diagram showing operations of FIG. 1.

FIG. 7 is a signal waveform diagram showing operations of FIG. 1. The operations of FIG. 1 will be explained below with reference to FIG. 7.

When a read request is done in an internal transfer-free state and a read request signal RRQ is given, an FF 21 is set so that a signal S21 outputted from the FF 21 is brought to "H". On the other hand, a latch signal LAT outputted from the latch controller 40 is brought to "L". Thus, latch signals LATA and LATB are respectively brought to "H" and "L" in the latches 15 and 25. Hence, signals S11 and S21 are respectively fetched into the latches 15 and 25.

Thereafter, when the delay time of the delay element 45 lying in the latch controller 40 has elapsed, the latch signal LAT is returned to "H". Thus, the latch signals LATA and LATH are respectively brought to "L" and "H", and the signals fetched into the latches 15 and 25 are respectively outputted as signals S15 and S25.

Now, when, after execution of the read request, a write request is done and a write request signal WRQ is given before the delay time of the delay element 45 elapses, the FF 11 is set. When the signal S11 of "H" set to the FF 11 is fetched into the latch 15 and the latch signal LAT is returned to "H", the signal S11 is outputted as the signal S15 from the latch 15. As a result, the signal S15 supplied to the NAND 12 of the arbitration unit 10A, and the signal S25 supplied to the NAND 22 of the arbitration unit 20A are brought to "H" at the same timing.

When the signals S15 and S25 are brought to "H" at the same timing, the arbitration unit 10A for write control takes priority over the arbitration unit 20A by the operation of the delay unit 30 for determining the order of priority provided between the arbitration unit 20A and the arbitration unit 10A in a manner similar to the conventional arbitration circuit of FIG. 2. Thus, a write control signal WT is brought to "H" so that a write transfer is started.

When the write transfer is completed, a transfer end signal END is given. Thus, the FF 11 is reset, so that the signal S11 is brought to "L" and the write set signal WS and write control signal WT are respectively returned to "H" and "L". Since a read control signal RT is "L" at this time, the FF 21 remains set and thereby the signal S21 is of "H".

Further, the latch signal LAT is brought to "L" in response to the transfer end signal END at the end of the write transfer. Thus, the signal S11 of the FF 11 and the signal S21 of the FF 21 are respectively fetched into the latches 15 and 25. When the delay time of the delay element 45 has elapsed, the latch signal LAT is returned to "H" and the signals fetched into the latches 15 and 25 are respectively outputted as their corresponding signals S15 and S25.

If the signal S11 of the FF 11 is not set at this time, then the read control signal RT is brought to "H" so that a read transfer is started. Incidentally, when the read transfer is completed, the corresponding transfer end signal END is given. Hence, the FF 21 is reset and restored to its initial state.

As described above, the arbitration circuit according to the first embodiment has the latches 15 and 25 for fetching therein the write request and the read request produced within the predetermined time and outputting the fetched requests at the same timing. Thus, an advantage is brought about in that since the timings for the signals S15 and S25 outputted from the latches 15 and 25 coincide with each other even when the write request and the read request are made at close intervals while the latch signal LAT supplied from the latch controller 40 is of "L", stable operations can be performed in accordance with the order of priority defined in advance.

Second Preferred Embodiment

Figure 8:
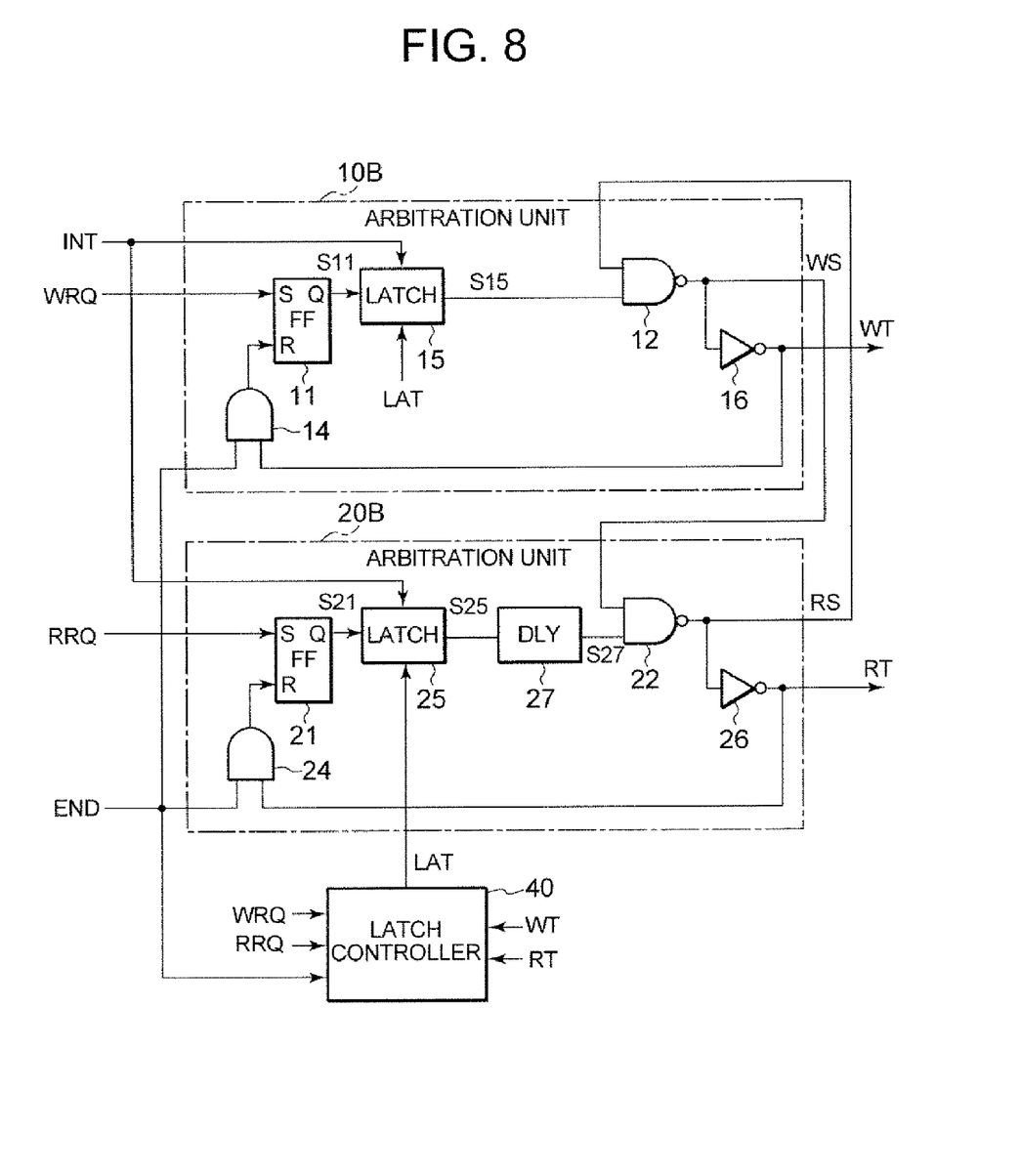
FIG. 8 is a configuration diagram of an arbitration circuit illustrating a second embodiment of the present invention.

FIG. 8 is a configuration diagram of an arbitration circuit showing a second embodiment of the present invention. Common reference numerals are respectively attached to elements common to those shown in FIG. 1.

The arbitration circuit comprises an arbitration unit 10B for write transfer control, an arbitration unit 20B for read transfer control, and a latch controller 40 similar to FIG. 1.

The arbitration unit 10B has an FF 11 whose set terminal S is supplied with a write request signal WRQ. An output terminal Q of the FF 11 is connected to the input side of a latch 15, and the output side of the latch 15 is connected to one input side of a NAND 12. The other input side of the NAND 12 is supplied with a read set signal RS of the arbitration unit 20B.

The output of the NAND 12 is supplied to the arbitration unit 20B as a write set signal WS and inverted by an inverter 16, followed by being outputted as a write control signal WT. The write control signal WT is ANDed with a transfer end signal END by an AND 14, and the result of ANDing is supplied to a reset terminal R of the FF 11.

On the other hand, the arbitration unit 20B has an FF 21 whose set terminal S is supplied with a read request signal RRQ. An output terminal Q of the FF 21 is connected to the input side of a latch 25. The output side of the latch 25 is connected to one input side of a NAND 22 through a delay element 27. The other input side of the NAND 22 is supplied with a write set signal WS of the arbitration unit 10B.

The output of the NAND 22 is supplied to the arbitration unit 10B as a read set signal RS and inverted by an inverter 26, followed by being outputted as a read control signal RT. The read control signal RT is ANDed with the transfer end signal END by an AND 24, and the result of ANDing is supplied to a reset terminal R of the FF 21.

Figure 9:
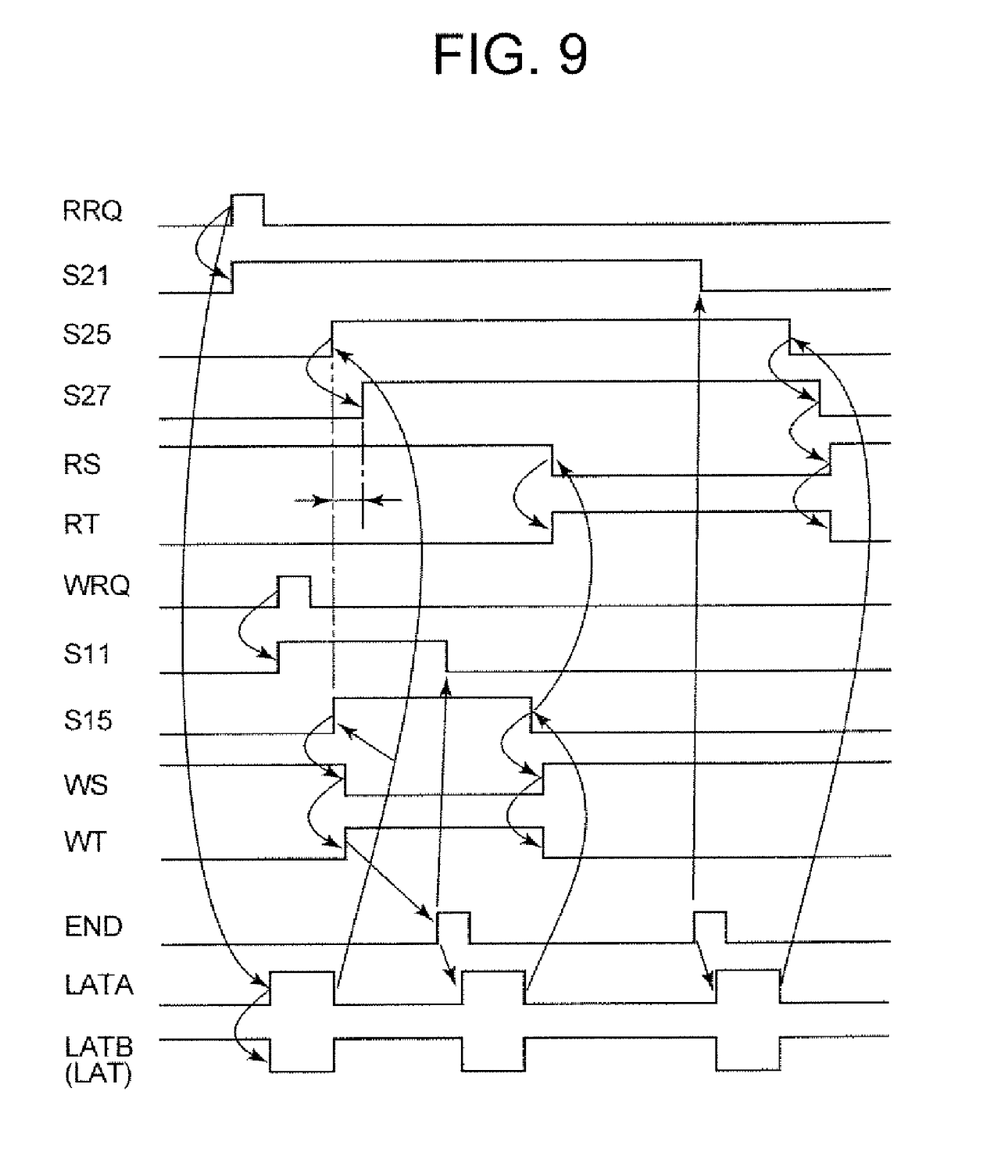
FIG. 9 is a signal waveform diagram showing operations of FIG. 8.

FIG. 9 is a signal waveform diagram showing operations of FIG. 8. The operations of FIG. 8 will be explained below with reference to FIG. 9. Incidentally, since the basic operation of FIG. 8 is identical to the first embodiment, the operations will be explained with a central focus on different points.

When a write request is given immediately after a read request in an internal transfer-free state, a signal S15 outputted from the latch 15 and a signal S25 outputted from the latch 25 are brought to "H" at the same timing in the same manner as in the first embodiment.

Thereafter, the signal S25 is delayed by the delay element 27, followed by being supplied to the NAND 22 as a signal S27. On the other hand, the signal S15 is immediately supplied to the NAND 12. Therefore, when the signal S27 of "H" is supplied to one input side of the NAND 22, a write set signal WS supplied to the other input side of the NAND 22 is already brought to "L". Thus, a write control signal WT high in priority is outputted and the output of a read control signal RT low in priority is hence suppressed.

As described above, the arbitration circuit according to the second embodiment has the latches 15 and 25 for respectively fetching therein the write request and the read request produced within the predetermined time and outputting the fetched requests at the same timing, and the delay element 27 for delaying the output signal of the latch 25 low in priority. Thus, since the timings for the signals S15 and S25 outputted from the latches 15 and 25 coincide with each other even when the write request and the read request are made at close intervals while the latch signal LAT supplied from the latch controller 40 is of "L", an advantage similar to the first embodiment is obtained. Further, the arbitration circuit according to the second embodiment brings about an advantage in that the circuit can be simplified as compared with the first embodiment.

Incidentally, the present invention is not limited to the above embodiments. Various medications are possible. As examples of the modifications, the following are brought about, for example.

(a) Although the arbitration circuit that adjusts the write and read timings for FIFO has been described, the present invention can be applied even to an arbitration circuit that adjusts other requests produced on an asynchronous basis.

(b) Although the two arbitration units are used, they are similarly applicable even to the case in which requests made on an asynchronous basis are three or more types. In such a case, a plurality of arbitration units may be connected in ring form via delay elements set in accordance with the order of priority, using set signals outputted from the arbitration units.

(c) The configurations of the filters 13 and 23 and the delay unit 30 are not limited to ones illustrated in FIG. 1 and may be ones each having a similar function.

(d) The configurations of the latch shown in FIG. 5 and the latch controller shown in FIG. 6 are illustrated by way of example. They can be replaced with ones each having a similar function.

What is claimed is:

1. An arbitration circuit comprising:

latch control means which outputs a latch signal of a predetermined pulse width when the occurrence of a first or second request signal is detected;

first holding means which is set by the input of the first request signal and reset when an operation required by the first request signal is completed;

first latch means which fetches therein a state of the first holding means while the latch signal is being outputted and outputs the fetched state when the latch signal is stopped;

first gate means which outputs a first enable signal in a set state of an output signal of the first latch means and when a delay enable signal is unsupplied;

second holding means which is set by the input of the second request signal and reset when an operation required by the second request signal is completed;

second latch means which fetches therein a state of the second holding means while the latch signal is being outputted and outputs the fetched state when the latch signal is stopped;

second gate means which outputs a second enable signal in a set state of an output signal of the second latch means and when the first enable signal is not outputted; and delay means which delays the second enable signal and supplies the delayed second enable signal to the first gate means as the delay enable signal.

2. An arbitration circuit comprising:

latch control means which outputs a latch signal of a predetermined pulse width when the occurrence of a first or second request signal is detected;

first holding means which is set by the input of the first request signal and reset when an operation required by the first request signal is completed;

first latch means which fetches therein a state of the first holding means while the latch signal is being outputted and outputs the fetched state when the latch signal is stopped;

first gate means which outputs a first enable signal in a set state of an output signal of the first latch means and when a second enable signal is unsupplied;

second holding means which is set by the input of the second request signal and reset when an operation required by the second request signal is completed;

second latch means which fetches therein a state of the second holding means while the latch signal is being outputted and outputs the fetched state when the latch signal is stopped;

delay means which delays an output signal of the second latch means; and second gate means which outputs the second enable signal in a set state of an output signal of the delay means and when the first enable signal is not outputted.

* * * * *